United States Patent [19]

Lum et al.

[11] 4,000,214
[45] Dec. 28, 1976

[54] URETHANE ADDITIVE TO A STANDARD EPOXY RESIN TO IMPROVE ADHESION TO VINYL MATERIALS

[75] Inventors: Dorey Lum, Suffern, N.Y.; Stuart J. Hartman, Livingston; Robert E. Schaefer, Riveredge, both of N.J.

[73] Assignee: Reichhold Chemicals, Inc., White Plains, N.Y.

[22] Filed: May 8, 1975

[21] Appl. No.: 575,535

Related U.S. Application Data

[63] Continuation of Ser. No. 364,272, May 29, 1973, abandoned.

[52] U.S. Cl. .......................... 260/835; 260/830 P
[51] Int. Cl.² ...................................... C08L 63/02
[58] Field of Search .................. 260/830 P, 835

[56] References Cited

UNITED STATES PATENTS

| 3,505,427 | 4/1970 | Aggias | 260/830 |
| 3,636,133 | 1/1972 | Hawkins | 260/824 EP |
| 3,663,652 | 5/1972 | Cannon | 260/830 P |
| 3,674,892 | 7/1972 | Aggias | 260/835 |

*Primary Examiner*—Paul R. Michl

[57] ABSTRACT

Curable resin compositions comprising a blend of an epoxy resin, a polyurethane resin which comprises the reaction product of (A) a polyisocyanate, (B) a polyester resin and (C) a dihydric alcohol, and a standard epoxy resin curing agent. These resinous compositions, when cured, retain excellent resilience and exhibit outstanding adhesion. They are especially useful for bonding vinyl materials.

4 Claims, No Drawings

URETHANE ADDITIVE TO A STANDARD EPOXY RESIN TO IMPROVE ADHESION TO VINYL MATERIALS

This is a continuation, of application Ser. No. 364,272, filed May 29, 1973 now abandoned. The present invention relates to novel curable resinous compositions comprising a blend of (I) a polyepoxide and (II) a polyurethane resin which is the reaction product of (A) an organic polyisocyanate, (B) a polyester resin which is the reaction product of a dicarboxylic acid or acid anhydride and a polyhydric alcohol containing at least 6 carbon atoms and (C) a polyhydric alcohol; the overall mol ratio of NCO to OH in the polyurethane resin being about 1:1. This blend may be cured by using any one of the standard epoxy curing agents such as polyamides and amines. Resin blends of this invention when cured are excellent general adhesives possessing good resiliency and have been found to be outstanding adhesives for bonding vinyl materials.

Epoxy resins have long been used as adhesives because of their many outstanding properties. These include inherently good adhesion to many surfaces, good wetting properties, ready availability, easy workability, low cost, compatibility with various fillers and the face that the cure time may be varied to suit the application.

However, prior art epoxy adhesives will not bond to all surfaces; particularly, vinyl surfaces. Heretofore, there has not been available an epoxy adhesive which would bond vinyl to vinyl or vinyl to some other substrate. The ability to bond vinyl is important to many industries. Increasingly, there has been a need for a high performance adhesive for bonding vinly because of the wide range of vinyl materials on the market. Vinyls are used as upholstery for furniture, as a covering on wall board, on ladies handbags and on luggage. Many items of clothing, especially outer wear, have decorative vinyl films applied and vinyl sheets and films are widely used in the interiors of automobiles.

It is, therefore, an object of this invention to provide novel curable resinous compositions suitable as adhesives.

Another object of this invention is to provide novel curable resinous compositions suitable as adhesives for bonding vinyls.

Further objects and the entire scope of applicability of the present invention will become apparent from the detailed specification given hereinafter; it should be understood, however, that the detailed specification and specific example while indicating preferred embodiments of the invention are given by way of illustration only, since various changes and modifications within the spirit and scope of this invention will become apparent to those skilled in the art.

Unexpectedly, it has now been found that these and other objects may be achieved by forming a curable resinous blend comprising (I) from about 80% to about 98% by weight based upon the total weight of (I) and (II) used of a polyepoxide and (II) from about 20% to about 2% by weight of a polyurethane resin comprising the reaction product of (A) an organic polyisocyanate, (B) a polyester resin which is the reaction product of a dicarboxylic acid or acid anhydride and a polyhydric alcohol containing at least 6 carbon atoms and (C) a dihydric alcohol; the overall mol ratio of NCO to OH in the polyurethane resin being about 1:1 This resinous blend may be cured by using from about 60 parts to about 100 parts by weight, per 100 parts by weight of the blend of a standard epoxy resin curing agent. The curable resinous blends have excellent storage life, are easily prepared and require no special handling.

As previously mentioned there is not presently available a high performance epoxy resin either modified or unmodified which will function as an adhesive for bonding plasticized or unplasticized vinyl.

However, referring to TABLE IV it can be seen that cured resinous compositions of instant invention are outstanding adhesives for bonding vinyl materials.

A wide variety of polyepoxide compounds were examined and it was found that only those based on epoxidized castoroil, epoxy novolacs and aliphatic ether epoxys did not produce acceptable results as a vinyl adhesive. The preferred polyepoxides are those formed by reacting epichlorohydrin with 4,4-isopropylidene diphenol and having a molecular weight ranging from about 340 to about 10,000. Most preferably the molecular weight range is from about 340 to about 560.

The amount of polyepoxide used in the blend may range from about 80 percent to about 98 percent by weight based upon the total weight of polyepoxide and polyurethane resin used. Superior results are obtained when using between about 90 percent and about 95 percent polyepoxide.

The polyurethane resins suitable for use with instant invention comprise the reacting product of an organic polyisocyanate, a polyester resin and as a chain extender a polyhydric alcohol.

The organic polyisocyante may be selected from those such as toluene diisocyanate and its isomers, p,p diphenol methane diisocyanate and isophorone diisocyanate. These are, in fact, the preferred isocyanates.

The polyester resin which is reacted with the polyisocyanate may be prepared by reacting a dicarboxylic acid or acid anhydride such as the phthalic acids and adipic, maleic, fumaric, sebacic, succinic acids and maleic, phthalic and succinic anhydrides and the like and mixtures thereof with a polyhydric alcohol having at least 6 carbon atoms.

These polyhydric alcohols may include for example, 1,7 heptane diol, 1,8 octane diol, 1,4 cycohexane dimethanol, 1,6 hexane diol, 1,10 decane diol and the like. Surprisingly, it has been found that if a polyhydric alcohol containing less than 6 carbon atoms is used, the final curable resinous blend does not function as an adhesive for vinyl materials. The preferred polyester resin is prepared by reacting together either adipic acid or phthalic anhydride with 1,6 hexane diol in a known manner until an acid number of less that 5 is achieved.

The mol ratio of acid to alcohol may vary with the alcohol being in excess and may be about 1:1.3. It has been found that no special precautions or procedures need be followed in preparing the polyester resins suitable for use with this invention other than those normally practiced in the art.

It is preferred to use a chain extender during the reaction between the isocyanate and the polyester resin. However, this is not essential. A dihydric alcohol may be used as the chain extender such as one selected from a group including ethylene glycol, 1,3 propylene glycol, 1,4 butylene glycol, diethylene glycol, 1,6 hexane diol, neopentyl glycol, 1,10 decane diol and the like. The use of 1,4 butylene glycol is preferred.

The polyurethane resin is prepared by adding to the polyester resin at elevated temperature at least 1 mol of polyisocyanate for each mol of hydroxyl present in the polyester resin. A slight excess of polyisocyanate should be added to insure that all the hydroxyl has been reacted and that the prepolymer is isocyanate terminated. Then a catalyst is added along with the chain extender. The amount of chain extender used is at least 1 mol of hydroxyl for each 1 mol of isocyanate present in the prepolymer and a slight excess of chain extender should be used to insure hydroxyl termination of the prepolymer. Next, more polyisocyanate is added at a ratio of about 1 mol isocyanate to 1 mol of hydroxyl present. The overall mol ratio of isocyanate to hydroxyl in the finished polyurethane is about 1:1. A solvent is added during the reaction to reduce viscosity. The finished resin has a non-volatility content of about 35 percent and a viscosity of about 50,000 to 80,000 cps at 25° C.

If the polyurethane is prepared without using a chain extender, the polyisocyanate is added at elevated temperature to the polyester resin in the presence of a catalyst. The ratio of isocyanate to hydroxyl is 1 mol to 1 mol. Solvent is added during the reaction to maintain processability. The non-volatile content of the finished resin is 35 percent.

In either case the course of the reaction is followed by viscosity increases. The reaction is terminated by adding a monohydroc alcohol when a 50/50 solution of reaction mass/dimethyl formamide has a Gardner Bubble viscosity of X-Y.

Catalysts useful during the preparation of the polyurethane resin include tertiary amines and heavy metal salts.

Solvents are added at different stages during the reaction to reduce viscosity and to aid mixing and processing. The preferred non-volatile content of the finished polyurethane resin should be about 35 percent. However, it may range from about 20 percent to 40 percent. Preferred solvents include aromatics, ketones, such as methyl ethyl ketone (MEK), dimethyl formamide (DMF), tetrahydrofuron (THF), toluene, xylene, benzene, ethyl acetate, butyl acetate and the like and mixtures thereof.

The temperature range of the reaction may range from about 60° to about 90° C. Higher temperatures may be used up to the reflex temperature of the solvent. Lower temperatures prolong the reaction.

The reaction time varies according to the temperature. At the preferred temperature range the reaction time is about 15 hours. However, since the course of the reaction is followed by viscosity this may also cause variations in the reaction time.

A typical polyester resin which may be used in the practice of this invention may be prepared by charging into the suitably equipped resin flask 2 mols of sebacic acid, 2.5 mols of 1,10 decane diol and 0.00003 mols tetraisopropyl titanate. The temperature is slowly raised to about 200° C under an inert gas sparge and held until the acid number is less than 1. The resin is then poured, allowed to cool and broken up for use.

A polyurethane resin may be prepared by placing 1 mol of a polyester resin prepared by reacting 1,10 decane diol and sebacic acid having an acid number of 0.7 into a resin flash fitted with stirrer, heating mantle, distillation column, thermometer, inert gas inlet. The temperature is raised to 65° C under an inert gas blanket and 2.2 mols of diphenyl methane diisocyanate is charged over a period of about 1.5 hours. Raise the temperature to about 85° C and hold for about 3 hours; then the solids content is adjusted to about 85% non-volatile by adding toluene. Next about 0.003 mols of triethyl amine catalyst and about 0.0009 mols of 24% lead naphthanate catalyst are added and the temperature is adjusted to 50° C. About 1.4 mols of 1,4 butylene glycol is charged and the temperature is raised to about 80° C and held for 1.5 hours. At the end of this time methyl ethyl ketone is added to bring the solids content to about 70% non-volatile. Cool to about 65° C and 0.2 mols of diphenyl methane diisocyanate is changed. Reaction conditions are maintained for about 5 hours during which time solvent (methyl ethyl ketone) is added to bring the solids content of the finished resin to 35% non-volatile and a final viscosity of about 50,000–80,000 cps at 25° C. A small amount of monohydric alcohol such as methanol may be added at the end of the reaction along with the last portion of solvent to react with any excess isocyanate which may be present to prevent excess viscosity increase.

The polyurethane resin at 35 percent non-volatile in solvent is blended with a polyepoxy resin to provide the curable resinous composition of instant invention. Either the epoxy may be charged into a kettle and the polyurethane resin added with stirring or vice versa. Preferably a small amount of solvent like that used to reduce the polyurethane resin is added to adjust the non-volatile of the finished blend to about 80 percent to 90 percent.

A typical curable resinous blend consists of charging 500 grams of an epichlorohydrin-4,4'isopropylidene diphenol epoxy resin having a molecular weight of about 380 into a resin flask at room temperature. Next 47.5 grams of dimethyl formamide is blended in with stirring. To this is added 107.5 grams of polyurethane resin and stirring is continued until the mass is homogeneous. The resinous blend is then ready to be cured.

Resinous blends of this invention may be cured utilizing any of those curing agents capable of curing an epoxy resin. These include cyanoguanidine, diethylene triamine, diphenylamine, triethylene tetramine, dicyandiamide, triethanol amine, and the like and mixtures thereof. The amount of curing agent used may range from 25 to 100 parts per 100 parts of resin solids used, preferrably from 60 to 100 parts of resin used.

It is understood that various fillers and diluents normally used with epoxy resins are also applicable herein. These include fillers such as cellulose, calcium carbonate, clays, aluminum, silica, and the like and diluents such as phenyl glycidyl ether, hydroxyethyl glycidyl ether and the like.

The invention will be more readily understood by reference to the accompanying specific examples which are intended as illustrative rather than as limiting the invention except as defined in the accompanying claims.

PREPARATION OF POLYESTER RESINS

EXAMPLE 1

To a 5 liter, 4 neck flask fitted with a stirrer, thermometer gas inlet tube, distillation head and condenser were charged 2062 grams of 1,6 hexane diol and 1958 grams adipic acid. The mixture was heated up to about 225° C under a nitrogen sparge with stirring. At 225° C, 0.12 grams of tetra-isopropanol titanate was added. The reaction conditions were maintained for about 19.5 hours while the water of condensation was distilled off. When the acid number was less than 1, the temperatures was allowed to drop to 110° C and the reaction mixture was vacuum stripped at 20–25 mm pressure to remove all volatiles. The hydroxyl number was 125.

EXAMPLES 2 to 15

Following the procedure outlined in Example 1, the following polyesters were prepared according to Table I.

followed by the rapid addition of 37.2 grams of ethylene glycol dissolved in 119 grams of methyl-ethyl ketone. After the exotherm subsided, the reaction was continued for 1.5 hours at about 75° C, then cooled at 65° C and 89.6 grams of isophorone diisocyanate were added in 10 minutes. The temperature was then increased to 75° C and reaction continued for another

TABLE I

| Example | Acid | No. of Grams | Alcohol | No. of Grams | OH No. of Finished Polyester | Acid No. |
|---|---|---|---|---|---|---|
| 2 | adipic | 1314 | 1,4 cyclohexane dimethanol | 1600 | 82.5 | .2 |
| 3 | phthalic anhydride | 1460 | 1,10 decane diol | 2175 | 73.2 | .4 |
| 4 | phthalic anhydride | 1332 | 1,6 hexane diol | 1311 | 86.9 | .3 |
| 5 | phthalic anhydride | 1480 | 1,10 decane diol | 2175 | 80.1 | .7 |
| 6 | phthalic anhydride | 1480 | 1,4 cyclohexane dimethanol | 1800 | 78.4 | .8 |
| 7 | sebacic | 1821 | 1,6 hexane diol | 1311 | 70.1 | .5 |
| 8 | sebacic | 2020 | 1,10 decane diol | 2175 | 75.6 | .3 |
| 9 | sebacic | 2020 | 1,4 cyclohexane dimethanol | 1800 | 86.1 | .2 |
| 10 | succinic | 1180 | 1,6 hexane diol | 1450 | 82.0 | .8 |
| 11 | succinic | 1180 | 1,10 decane diol | 2175 | 75.3 | .7 |
| 12 | succinic | 1180 | 1,4 cyclohexane dimethanol | 1800 | 81.8 | .6 |
| 13 | maleic anhydride | 980 | 1,6 hexane diol | 1450 | 68.9 | .5 |
| 14 | maleic anhydride | 980 | 1,10 decane diol | 1450 | 79.2 | .4 |
| 15 | maleic anhydride | 980 | 1,4 cyclohexane dimethanol | 1800 | 89.3 | .6 |

PREPARATION OF POLYURETHANE RESINS

EXAMPLE 16

A polyester resin (300 grams) prepared from 1,6 hexane diol and adipic acid according to Example 1 was charged into a resin kettle fitted with an anchor stirrer, thermocouple, addition funnel, inert gas sparge and heating mantle. Heat was applied and nitrogen fed into the kettle and the temperature was raised with stirring to 65° C. Then 74.3 grams of isophorone diisocyanate was added slowly over a period of about 1.5 hours. After addition of all of the isocyanate, the temperature was increased to 80°–85° C and maintained for 3 hours after which the temperature was descreased to 70° C and 83 grams anhydrous toluene was added. Resin solids at this point were about 85%. After further cooling to 50° C, 0.09 grams of triethylamine and 0.47 grams of 24% lead naphthanate was added. This was 1.5 hours at which point the temperature was lowered to 65° C again and an additional 29.5 grams of isophorone diisocyanate was added in 10 minutes and the reaction continued at 75° C. The course of the reaction was then followed by viscosity increases. As the viscosity increased, additional solvent was added in gram portions to reduce the viscosity of the reaction mass. The reaction was terminated by the addition of 1.8 grams of methanol and 168 grams of methyl-ethyl ketone when the viscosity of 1/1 batch/dimethyl formamide solution had a Gardner bubble viscosity of X-Y. This viscosity was taken when the batch contained 40% solids. The final viscosity was 50,000 cps and had a non-volatile content of 35 percent.

EXAMPLES 17 to 28

Polyurethane resins were prepared according to Example 16 except that various polyesters, isocyanates and chain extenders were used as indicated in the following Table II.

TABLE II

| Polyurethane Resin Example | Polyurethane Resins | | | | Polyester Resin Example |
|---|---|---|---|---|---|
| | Isocyanate | No. Gms Used | Chain Extender | No. Gms Used | |
| 16 | isophorone | 133.4 | ethylene glycol | 37.2 | 1 |
| 17 | TDI | 178.2 | NPG | 83.4 | 2 |
| 18 | TDI | 139.9 | NPG | 59.3 | 1 |
| 19 | TDI | 181.2 | NPG | 87.2 | 4 |
| 20 | MDI | 256.0 | 1,3 propylene glycol | 61.0 | 2 |
| 21 | TDI | 171.4 | 1,3 propylene glycol | 59.7 | 3 |
| 22 | isophorone | 231.4 | 1,4 butylene glycol | 72.7 | 4 |
| 23 | MDI | 170.6 | diethylene glycol | 49.4 | 5 |
| 24 | TDI | 125.5 | 1,6 hexane diol | 60.1 | 6 |
| 25 | isophorone | 218.1 | NPG | 82.2 | 7 |
| 26 | TDI | 207.2 | 1,4 butylene glycol | 77.5 | 1 |
| 27 | MDI | 192.9 | 1,10 decane diol | 98.9 | 8 |
| 28 | TDI | 155.6 | 1,4 butylene glycol | 89.7 | 9 |
| 29 | TDI | 170.3 | NPG | 82.2 | 7 |
| 30 | isophorone | 181.7 | 1,4 butylene glycol | 51.9 | 15 |
| 31 | TDI | 193.3 | NPG | 89.4 | 10 |

TABLE II-continued

| Polyurethane Resin Example | Polyurethane Resins | | | | Polyester Resin Example |
|---|---|---|---|---|---|
| | Isocyanate | No. Gms Used | Chain Extender | No. Gms Used | |
| 32 | MDI | 192.8 | 1,4 butylene glycol | 51.1 | 11 |
| 33 | TDI | 153.5 | ethylene glycol | 41.0 | 12 |
| 34 | TDI | 175.0 | NPG | 78.0 | 12 |
| 35 | MDI | 44.0 | none | — | 13 |
| 36 | TDI | 77.0 | none | — | 1 |
| 37 | TDI | 37.0 | none | — | 14 |
| 38 | isophorone | 159.4 | 1,6 hexane diol | 58.5 | 10 |

TDI = toluene diisocyanate
MDI = p,p'diphenyl methane diisocyanate
isophorone = isophorone diisocyanate
NPG = neopentyl glycol

EXAMPLE 29

To a reaction set up as previously described in Example 16 was charged 300 grams of a polyester prepared from maleic anhydride and 1,10 decane diol according to Example 14. The temperature was raised with stirring under a nitrogen blanket to about 70° C. The 0.07 grams of triethylamine and .34 grams of 24% lead naphthanate are added. After homogenization, 35.1 grams of toluene diisocyanate were added over a period of about 30 minutes. Reaction conditions were maintained at a temperature of 75° to 80° C for about 4.5 hours with addition of about 250 grams of a 50/50 mixture by weight of methyl ethyl ketone/toluene solvent to keep the viscosity from getting too high. At this point, the temperature was lowered to 65° C and another 1.9 grams of toluene diisocyanate was added. Additional methyl-ethyl ketone was added portionwise until the batch contained 40% solids to the 1/1 batch dimethyl formamide Gardner bubble viscosity was X-Y. The reaction was terminated by adding 2 grams of methyl alcohol and 120 grams of methyl-ethyl ketone.

EXAMPLE 30

Example 29 was repeated exactly except that 300 grams of a polyester prepared from maleic anhydride and 1,4 cyclohexane dimethanol according to Example 15 was used. The isocyanate used was 181.7 grams of isophorone diisocyanate. The chain extender was 51.1 grams of 1,4 butylene glycol.

PREPARATION OF CURABLE RESINOUS BLENDS

The curable resinous blends of this invention are prepared easily by merely mixing together a polyepoxide and one of the polyurethane resins. A small amount of a solvent such as methyl ethyl ketone, toluene or dimethyl formamide may be added to bring the solids content of the finished resin blend to about 80%–85% solids. However, this is for convenience and ease of blending and is not required. Curable resinous blends were prepared as shown in Table III.

TABLE III

| Example | Polyurethane Resin From Example | No. Gms of Polyurethane Resin | Polyepoxide Resin (100 gms used in all cases) | No. Gms Solvent |
|---|---|---|---|---|
| 39a | 18 | 3 | 4,4 isopropylidene epichlorohydrin resin mol wt 340–360 | 15.1 |
| 39b | 18 | 5 | " | 18.8 |
| 39c | 18 | 7.5 | " | 23.5 |
| 39d | 18 | 10 | " | 28.1 |
| 40 | 17 | 7.5 | " | 23.5 |
| 41a | 18 | 3 | " | 15.1 |
| 41b | 18 | 5 | " | 18.8 |
| 41d | 18 | 10 | " | 28.1 |
| 41e | 18 | 15 | " | 37.3 |
| 42c | 19 | 7.5 | " | 18.7 |
| 42d | 19 | 10 | " | 21.7 |
| 42e | 19 | 15 | " | 27.3 |
| 43b | 26 | 5 | " | 18.8 |
| 43c | 26 | 7.5 | " | 23.5 |

The solvent used is the indicated number of grams of a blend of the following: 47% methyl ethyl ketone, 12% toluene and 41% dimethyl formamide.

PERFORMANCE DATA ON RESINOUS BLENDS

The curable resinous blends prepared as heretofore described were used as adhesives on a wide range of materials. Results obtained and tabulated in Table IV may be compared to the "Control" adhesive which is a low molecular weight epoxy cured with a polyamide. As can easily be seen, resinous blends of this invention are excellent general adhesives and exhibit outstanding performance for bonding vinyls.

TABLE IV

| EXAMPLE | CURABLE RESIN BLEND AS PER EXAMPLE | CURING AGENT | SUBSTRATE/ SUBSTRATE | PEEL STRENGTH LBS. OF PULL/LINEAR INCH AT VARIOUS RATIOS EPOXY/POLYURETHANE | | | | |
|---|---|---|---|---|---|---|---|---|
| | | | | 100/3 A | 100/5 B | 100/7.5 C | 100/10 D | 100/ E |
| 50 | 39 | polyamide | vinyl-vinyl[1] | 15 | 17 | 17 | 12.5 | |
| | | | vinyl-wood | 40 | 22 | 24 | 40 | |
| | | | vinyl-vinyl[2] | 13 | 15 | 12.5 | 21 | |
| | | | vinyl[2]-wood | 50 | 18 | 42.5 | 42.5 | |
| 51 | 40 | polyamide | vinyl-vinyl | | | 34 | | |
| | | | vinyl[2]-wood | | | 42.5 | | |
| 52 | 41 | polyamide | vinyl-vinyl | 7.5 | 16 | | 19 | 13 |
| | | | vinyl-wood | 40 | 32.5 | | 18 | 25 |
| | | | vinyl-vinyl[2] | 16 | 16 | | 13 | 20 |

TABLE IV-continued

| | | | | PEEL STRENGTH | | | | |
|---|---|---|---|---|---|---|---|---|
| | | | | LBS. OF PULL/LINEAR INCH AT VARIOUS RATIOS EPOXY/POLYURETHANE | | | | |
| | CURABLE RESIN BLEND | CURING | SUBSTRATE/ | 100/3 | 100/5 | 100/7.5 | 100/10 | 100/ |
| EXAMPLE | AS PER EXAMPLE | AGENT | SUBSTRATE | A | B | C | D | E |
| 53 | 42 | polyamide | vinyl²-wood | 30 | 45 | | 27 | 40 |
| | | | vinyl-vinyl | | | 12.5 | 11 | 7.5 |
| | | | vinyl-wood | | | 27.5 | 12.5 | 13 |
| 54 | 43 | polyamide | vinyl-vinyl | | 27.5 | 20 | 14 | |
| | | | vinyl-wood | | 25 | 30 | 37.5 | |
| | | | vinyl-vinyl² | | 7.5 | 25 | 20 | |
| | | | vinyl²-wood | | 50 | 47.5 | 37.5 | |
| 55 | 44 | polyamide | vinyl²-vinyl² | | | 15 | | |
| | | | vinyl²-wood | | | 36 | | |
| 56 | 45 | polyamide | vinyl-vinyl | | | 7.5 | | 7.5 |
| | | | vinyl-wood | | | 17.5 | | 29 |
| 57 | 46 | polyamide | vinyl-vinyl | | | 12.5 | 12 | 12.5 |
| | | | vinyl-wood | | | 13 | | |
| | | | vinyl²-wood | | | | 10 | 11 |
| 58 | 48 | polyamide | vinyl-vinyl | | | 37.5 | | |
| | | | vinyl-wood | | | 25.0 | | |
| 59 | 49 | polyamide | vinyl-vinyl | | | 30.5 | | |
| | | | vinyl-wood | | | 22.5 | | |
| 60 | control | polyamide | vinyl-vinyl | no bond | no bond | no bond | no bond | no bond |
| | | | vinyl-wood | no bond | no bond | no bond | no bond | no bond |
| | | | vinyl²-wood | no bond | no bond | no bond | no bond | no bond |

[1] plasticized polyvinyl chloride resin
[2] expanded plasticized vinyl foam

EXAMPLE 61

CURE WITH HARDENERS OTHER THAN A POLYAMIDE WHICH GIVE GOOD ADHESION

TABLE V

| Hardener | Polyurethane Resin From Example | No. Gms of Polyurethane Resin | Polyepoxide Resin (100 Gms used in all cases) | No. Gms of Solvent |
|---|---|---|---|---|
| 1 | 18 | 7.5 | epichlorohydrin 4,4 isopropylidene diphenol (mol wt. 340-360) | 23.5* |
| 2 | 18 | 7.5 | " | 23.5* |
| 3 | 18 | 7.5 | " | 23.5* |
| 4 | 18 | 7.5 | " | 23.5* |
| 5 | 18 | 7.5 | " | 23.5* |
| 6 | 18 | 7.5 | " | 23.5* |

1 Epotuf epoxy resin hardener 37-614 is a proprietary product manufactured by Reichhold Chemicals, Inc., 525 North Broadway, White Plains, New York 10602.
2 Modified cyclic amine - a blend of n-aminoethylpiperazine and nonyl phenol.
3 Modified cyclic amine - a blend of n-aminoethylpiperazine and nonyl phenol but using about 2.8 times more nonyl phenyl than in (2) above.
4 A 50/50 blend by weight of (2) above and Epotuf epoxy resin hardener 37-620. Epotuf epoxy resin hardener 37-620 is a proprietary product manufactured by Reichhold Chemicals, Inc., 525 North Broadway, White Plains, New York 10602.
5 A 50/50 blend, by weight, of Epotuf epoxy resin hardeners 37-614 and 37-620.
6 A 50/50 blend, by weight, of Epotuf epoxy resin hardeners 37-620 and 37-622. Epotuf epoxy resin hardener 37-622 is a proprietary product manufactured by Reichhold Chemicals, Inc., 525 North Broadway, White Plains, New York 10602.
*The solvent used is the indicated number of grams of a blend of the following: 47% methyl ethyl ketone, 12% toluene and 41% dimethyl formamide.

What is claimed is:

1. A curable urethane modified epoxy resin composition suitable, on addition of a curing agent, for use as an adhesive for bonding vinyl materials, said composition consisting essentially of a blend of (I) from about 90% to about 95%, by weight, based upon the total weight of (I) and (II) used of a polyepoxide which is a diglycidyl ether of 4,4'-isopropylidene diphenol having a molecular weight ranging from about 340 to 10,000 (II) from about 5% to about 10%, by weight, based upon the total weight of (I) and (II) used of a polyurethane resin comprising the reaction product of (A) an organic polyisocyanate selected from a group consisting of toluene diisocyanate, p,p'-diphenylmenthane diisocyanate and isophorone diisocyanate (B) a polyester resin which is the reaction product of a dicarboxylic acid which is at least one member selected from a group consisting of adipic acid, succinic acid, sebacic acid and phthalic anhydride and a polyhydric alcohol which is at least one member selected from a group consisting of 1,6 hexanediol and 1,10 decanediol and (C) a chain extender comprising a dihydric alcohol selected from a group consisting of butylene glycol and neopentyl glycol; the overall mol ratio of NCO to OH in the polyurethane resin being about 1:1.

2. The curable resin composition according to claim 1 wherein a curing agent is added.

3. The curable resin composition according to claim 2 wherein the amount of curing agent used ranges from about 60 parts to about 100 parts, by weight, per 100 parts of (I) plus (II).

4. The curable resin composition according to claim 2 wherein the curable resin composition is dissolved in a solvent.

* * * * *